Patented Oct. 9, 1945

2,386,640

UNITED STATES PATENT OFFICE 2,386,640

BIS ESTERS OF IODINATED PHENYL ALIPHATIC CARBOXYLIC ACIDS

William H. Strain, Rochester, N. Y., John T. Plati, Passaic, N. J., and Stafford L. Warren, Oak Ridge, Tenn., assignors of one-half to Noned Corporation, and one-half to Eastman Kodak Company, both of Rochester, N. Y., a corporation of New Jersey No Drawing. Application May 5, 1944, Serial No. 534,348

5 Claims. (Cl. 260—476)

This invention relates to bis esters of iodinated phenyl aliphatic carboxylic acids, useful as contrast media in radiography, roentgenography or skiagraphy, and to a process for the preparation of such esters. This application is a continuation-in-part of our copending application Serial No. 339,912, filed June 11, 1940 (now United States Patent 2,348,231, dated May 9, 1944).

It is known that certain halogenated vegetable oils, such as iodinated rapeseed, poppyseed or chloriodinated peanut oil, can be employed to produce radiopacity. Such preparations suffer from the defects that they cannot be sterilized and are poorly absorbed by the body tissues. Furthermore, when these compounds are introduced into certain cavities of the body, such as the subarachnoid space of the spinal column or the brain cavity, they are not eliminated by the body and by their continued presence may cause serious damage to vital parts.

In our parent application 339,912, we have disclosed both mono and bis esters of iodinated phenyl aliphatic carboxylic acids. These esters are all free-flowing liquids (although the bis esters are more viscous than the mono) and are suited particularly for the production of radiopacity in those parts of the body where there are natural cavities, or where cavities have been produced by accident or by operation. The instant application is directed particularly to the bis esters and their preparation. These bis esters are especially suited for the production of opacity in the bronchial passages, sinuses, fistulae and empyema cavities.

The bis esters of our invention can be represented by the following general formula:

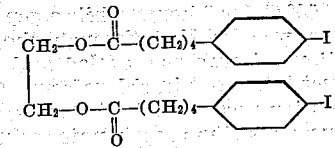

wherein R represents a member selected from the group consisting of saturated acyclic hydrocarbon groups having not less than 4 carbon atoms and not more than 18 carbon atoms, $x$ represents a whole number not greater than 3, and $R_1$ represents a divalent radical selected from the group consisting of —CH$_2$—CH$_2$—,

—CH$_2$—CH$_2$—CH$_2$—

—CH$_2$—CH—
           |
           CH$_3$ and

—CH$_2$—CH—CH$_2$—
       |
       O
       |
       O—C—R—⟨phenyl⟩—I$_{(x)}$ wherein R and $x$ have the values given above.

In accordance with our invention, we prepare the above formulated bis esters by esterifying ethylene glycol, trimethylene glycol (1,3-propylene glycol), 1,2-propylene glycol or glycerol with an iodinated phenyl aliphatic carboxylic acid of the following general formula:

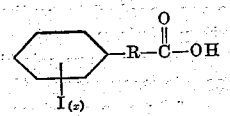

wherein R and $x$ have the values given above. The esterification is advantageously carried out in the presence of an acid esterification catalyst, e. g. p-toluenesulfonic acid. Ordinarily, we have found it advantageous to effect the esterification by mixing the alcohol and acid together in the presence of the acid esterification catalyst and heating the mixture for several hours.

The following examples will serve to illustrate our new bis esters and the manner of obtaining the same. In the following examples, the parts given are by weight.

*Example 1.*—Ethylene-bis-[δ-(p-iodophenylvalerate)]

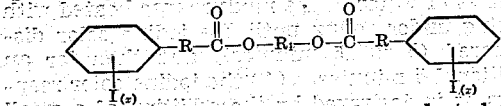

A mixture of 31 parts of ethylene glycol, 304 parts of δ-(p-iodophenyl)-valeric acid and 10 parts of p-toluenesulfonic acid were heated together at 150° C. for 3 hours while a stream of nitrogen was passed through the mixture. The mixture was cooled, taken up in chloroform and the chloroform solution washed with dilute aqueous sodium bicarbonate solution and then with water, to remove unreacted material. The washed chloroform solution was treated with decolorizing charcoal to remove colored impurities. The ester was obtained, by evaporating the chloroform from the decolorized solution, in good yield, as a colorless and tasteless oil of medium viscosity.

*Example 2.*—Ethylene bis (iodophenylundecylate)

A mixture of 194 parts of iodophenylundecylic acid, 15.5 parts of ethylene glycol and 2 parts of p-toluenesulfonic acid was heated at 150° C. for three hours while a gentle stream of nitrogen was bubbled through the mixture. The reaction mixture was then cooled and taken up in chloroform.

The chloroform solution was washed with water and then with dilute aqueous sodium carbonate solution and finally with water. The washed chloroform solution was then dried over anhydrous sodium sulfate. Following drying the chloroform was removed by distillation. The residue was taken up in petroleum ether and the resulting solution decolorized with activated charcoal. The solvent was removed from the decolorized solution under reduced pressure. The product remaining was the bis ester. It was obtained as a pale yellow viscous oil. The bis ester was essentially ethylene bis (p-iodophenylundecylate.

*Example 3.—Trimethylene bis-(iodophenylundecylate)*

A mixture of 155 parts of p-iodophenylundecylic acid, 15.2 parts of trimethylene glycol and 2 parts of p-toluene-sulfonic acid was heated under an esterifying column for 1½ hours in an oil bath maintained at 175° C., the water formed during the esterification being taken off as the esterification proceeded. At the end of 1½ hours, the reaction mixture was cooled to ordinary room temperature and then taken up in 100 volumes of chloroform. The chloroform solution was washed with 50 volumes of warm water, then with two 50-volume portions of 2 per cent (by weight) aqueous potassium carbonate solution, and finally with two 50-volume portions of warm water. The washed chloroform solution was then dried over anhydrous sodium sulfate. The dried solution was decolorized with activated charcoal and the chloroform was removed by heating on a steam bath. The product which remained was the bis ester. It was obtained as a tasteless, odorless viscous oil. This ester was essentially trimethylene bis-(p-iodophenylundecylate).

*Example 4.—Propylene bis-(idodphenylundecylate)*

A mixture consisting of 83.5 parts of 1,2-propylene glycol, 858 parts of p-iodophenylundecylic acid and 10 parts of p-toluene-sulfonic acid was heated at 150° C. for 3 hours, while a gentle stream of nitrogen was bubbled through the mixture. The reaction mixture was cooled and the reaction product taken out in chloroform. The chloroform solution was washed with water, then with dilute aqueous sodium carbonate solution and finally with water. The chloroform solution was dried over anhydrous sodium sulfate and the chloroform removed by distillation on a steam bath. The residue was taken up in petroleum ether, the petroleum ether solution decolorized with activated charcoal and the petroleum ether removed under reduced pressure. The product remaining was the bis ester. It was obtained as a pale yellow viscous oil, which was odorless and tasteless. This ester was essentially 1,2-propylene bis (p-iodophenylundecylate).

*Example 5.—Glyceryl tri-[δ-(p-iodophenyl)-valerate]*

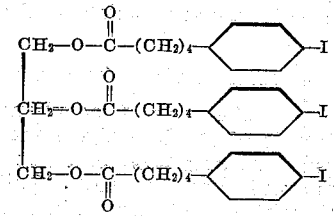

A mixture of 30.7 parts of glycerol, 304 parts of δ-(p-iodophenyl)-valeric acid and 10 parts of p-toluenesulfonic acid was heated at 150° C. for 3 hours, while a stream of nitrogen was passed through the mixture. The reaction product was cooled and taken up in chloroform. The chloroform solution was washed with water and then with dilute aqueous sodium carbonate solution and finally with water. The washed chloroform solution was treated with activated charcoal to decolorize it. The decolorized chloroform solution was distilled on a steam bath to remove the chloroform. The viscous oil remaining was the bis ester.

*Example 6.—Glyceryl tri-iodophenylundecylate*

A mixture consisting of 92 parts of glycerol, 1280 parts of iodophenylundecylic acid and 15 parts of p-toluenesulfonic acid was heated at 150° C. for 3 hours while a gentle stream of nitrogen was bubbled through the mixture. The reaction mixture was cooled and the reaction product was taken up in chloroform. The chloroform solution was washed with water, then with dilute aqueous sodium carbonate solution and finally with water. The washed chloroform solution was then dried over anhydrous sodium sulfate. The chloroform was then removed from the solution by distillation on a steam bath. The residue was taken up in petroleum ether and the solution decolorized with activated charcoal. The petroleum ether was removed under reduced pressure. An excellent yield bis ester remained as a pale yellow viscous oil. This ester was essentially glyceryl tri-(p-iodophenylundecylate).

In a manner similar to that illustrated in the foregoing examples, bis esters can be prepared from other iodinated aliphatic carboxylic acids. Phenyl aliphatic carboxylic acids are known and reference to their preparation is given by Strain, Plati and Warren in J. Am. Chem. Soc., 65, 1273 (1943). All of these phenyl aliphatic carboxylic acids can be iodinated according to the methods given in the aforesaid publication by Strain, Plati and Warren. The following example illustrates the iodination of phenylundecylic acid.

*Example 7.—Iodophenylundecylic acid*

To a solution of 610 parts of iodine in 4000 parts of glacial acetic acid at 100° C., were added 400 volumes of sulfuric acid, 1572 parts of phenylundecylic acid (prepared according to Fourneau and Barangar, Bull. soc. chim., 49, 1161 (1931)), and 278 parts of sodium iodate dissolved in 700 volumes of water. The mixture was heated with stirring under reflux until the iodine color disappeared (5 to 15 minutes), and then for an additional 5 minutes. (As the iodine color reappears, it is destroyed by the addition of a small amount of saturated aqueous sodium iodate solution.) When the reaction was complete, the hot reaction mixture was poured onto 500 parts of cracked ice and any free iodine, iodate ion and chlorate ion were reduced by the addition of sodium bisulfite. The organic layer was taken up in 2000 volumes of carbontetrachloride. The carbontetrachloride solution was washed twice with warm (35° C.) water. The iodophenylundecylic acid was obtained by distilling off the carbontetrachloride followed by heating the residue on the steam bath under reduced pressure. The iodophenylundecylic acid was obtained as a reddish liquid at a moderate viscosity. The phenylundecylic acid employed in this example to make the iodophenylundecylic acid is a mixture of two isomers which can be represented by the following formulas:

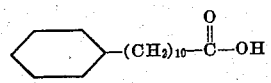

and

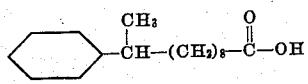

Accordingly, the iodinated phenylundecylic acid obtained in this example is a mixture of two isomers corresponding to the formulas given immediately above. In both isomers, the iodine goes into the benzene ring principally to the para position of the aliphatic group. The bis esters prepared from such iodophenylundecylic acid are likewise mixtures of isomers corresponding to the above formulated phenylundecylic acids. In other words, the bis ester of Example 4 is principally a mixture of two esters which can be represented by the following formulas:

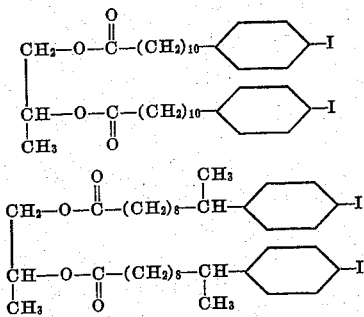

What we claim as our invention and desire to be secured by Letters Patent of the United States is:

1. The bis esters having the following general formula:

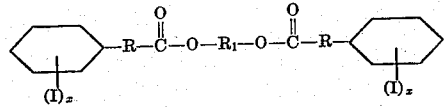

wherein R represents a member selected from the group consisting of saturated acyclic hydrocarbon groups having not less than 4 carbon atoms and not more than 18 carbon atoms, $x$ represents a whole number not greater than 3, and $R_1$ represents a divalent radical selected from the group consisting of $-CH_2-CH_2-$, $-CH_2-CH_2-CH_2-$,

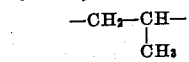

and

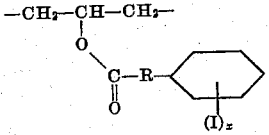

wherein R and $x$ have the values given above.

2. The bis esters having the following general formula:

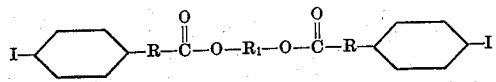

wherein R represents a member selected from the group consisting of saturated acyclic hydrocarbon groups having not less than 4 and not more than 18 carbon atoms, and $R_1$ represents a divalent radical selected from the group consisting of $-CH_2-CH_2-$, $-CH_2-CH_2-CH_2-$, $-CH_2-CH-$
$\quad\quad\quad|$
$\quad\quad\quad CH_3$ and

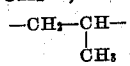

wherein R has the value given above.
3. Trimethylene bis (iodophenylundecylate).
4. 1,2-propylene bis (iodophenylundecylate).
5. Ethylene bis [δ-(p-iodophenyl)-valerate].

WILLIAM H. STRAIN.
JOHN T. PLATT.
STAFFORD L. WARREN.